United States Patent
Chang

[11] Patent Number: 5,503,138
[45] Date of Patent: Apr. 2, 1996

[54] BARBECUE OVEN

[76] Inventor: Jing-Sung Chang, No. 20, Kuang-Fu Rd., Tan-Chien Tsun, Ta Cheng Hsiang, Changhua Hsien, Taiwan

[21] Appl. No.: 497,748

[22] Filed: Jul. 3, 1995

[51] Int. Cl.⁶ .................................................. A47J 37/00
[52] U.S. Cl. ........................ 126/25 R; 126/9 R; 126/9 A
[58] Field of Search ..................... 126/9 R, 9 A, 126/9 B, 25 R, 38, 29, 30, 43; 99/450, 449

[56] References Cited

U.S. PATENT DOCUMENTS

| | | | |
|---|---|---|---|
| 1,102,649 | 7/1914 | Dix | 126/9 A |
| 2,091,951 | 9/1937 | Anthony | 126/9 A |
| 3,727,979 | 4/1973 | Schier | 126/9 A |
| 4,140,099 | 2/1979 | Newport | 126/9 A |
| 4,794,906 | 1/1989 | Longley, Jr. | 126/9 B |

FOREIGN PATENT DOCUMENTS

| | | | |
|---|---|---|---|
| 438327 | 7/1991 | European Pat. Off. | 126/9 B |

Primary Examiner—James C. Yeung
Attorney, Agent, or Firm—Browdy and Neimark

[57] ABSTRACT

A barbecue oven integrally made from a plane metal plate by punching at one time. Before used, the barbecue oven has a substantially flat cross-like pattern, including a bottom section, two long side sections and two short side sections. Multiple equally spaced elliptic holes are punched along four adjoining portions between the bottom section, long side sections and short side sections to form four bending lines, whereby the long and short side sections can be bent and securely connected by lateral engaging lugs thereof to form a box-like pattern defining a chamber. Multiple equally spaced circular holes are formed on the long and short side sections for ventilation. Support legs and ventilating slots are formed on the bottom section by punching. The support legs can be outward bent to support the barbecue oven and the ventilating slots can be selectively opened according to ventilation requirement. Bendable support portions and handle portions are formed on the short side-sections. A barbecue rack can be selectively placed on the long side sections or the support portions.

1 Claim, 4 Drawing Sheets

BARBECUE OVEN

BACKGROUND OF THE INVENTION

The present invention relates to a barbecue oven which is easily manufactured from a plane metal plate by punching at low cost. Before used, the barbecue oven has a flat pattern and can be stored and transferred without occupying much room. In use, the support legs of the barbecue oven are perpendicularly bent to support the barbecue oven.

Nowadays, a barbecue rack or oven is widely used in barbecue. FIG. 1 shows a conventional barbecue oven including an oven body 1, two support legs 2 and a metal rack 3. The oven body 1 is integrally made, having a chamber 10 for containing charcoal. Two L-shaped handles 11 are disposed on two sides of the oven body 1 for moving the oven. The support legs 2 serve to support the oven body 1 in a position above the ground so as to prevent the barbecued food from being contaminated by the dust or dirt. The metal rack 3 is placed on the oven body 1 so as to barbecue the food thereon.

Several shortcomings exist in the above barbecue oven as follows:

1. The oven body is integrally made and has a considerably large volume so that when stored or transferred, the barbecue oven will occupy much room to increase the transferring cost.

2. The oven body is provided with the lateral handles and lower support legs so that the manufacturing procedure of the barbecue oven is troublesome and time-costing.

3. The conventional barbecue oven is composed of complicated components so that the manufacturing cost thereof is increased.

SUMMARY OF THE INVENTION

It is therefore a primary object of the present invention to provide a barbecue oven which is integrally made from a plane metal plate by punching so that the manufacturing procedure of the barbecue oven is simplified and the manufacturing time and cost of the barbecue oven are reduced.

It is a further object of the present invention to provide the above barbecue oven which has a flat pattern before used so as to reduce the storing and transferring room for the barbecue oven.

It is still a further object of the present invention to provide the above barbecue oven in which the short side sections are formed with inward bendable support portions higher than the long side sections so that the rack can be selectively placed on the long side sections or the support portions in the case that more charcoal is contained in the barbecue oven.

It is still a further object of the present invention to provide the above barbecue oven in which the bottom section is formed with ventilating slots which can be selectively opened so as to ventilate the chamber and exhaust the ash of the charcoal therefrom.

The present invention can be best understood through the following description and accompanying drawings, wherein:

DETAILED DESCRIPTION OF THE PREFERRED EMBODIMENT

Figure 1:
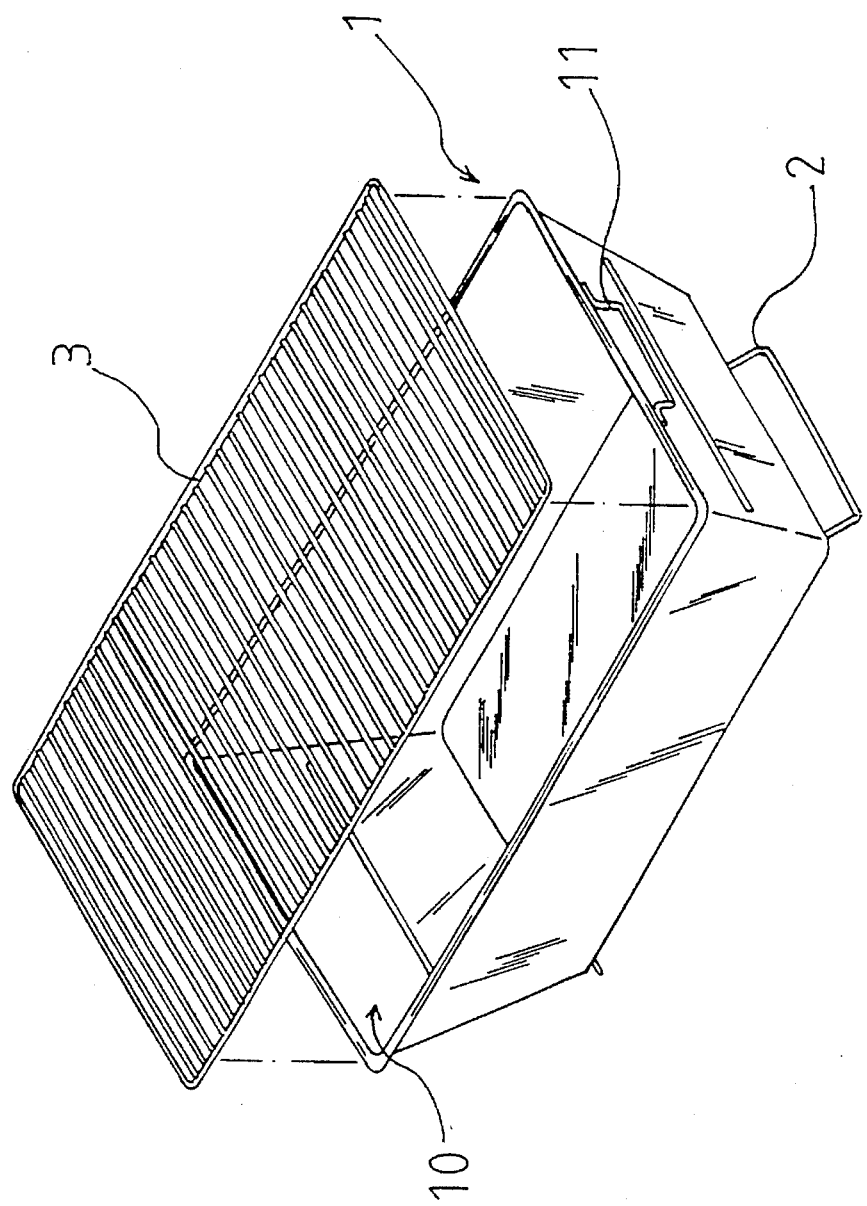
FIG. 1 is a perspective view of a conventional barbecue oven.
Figure 2:
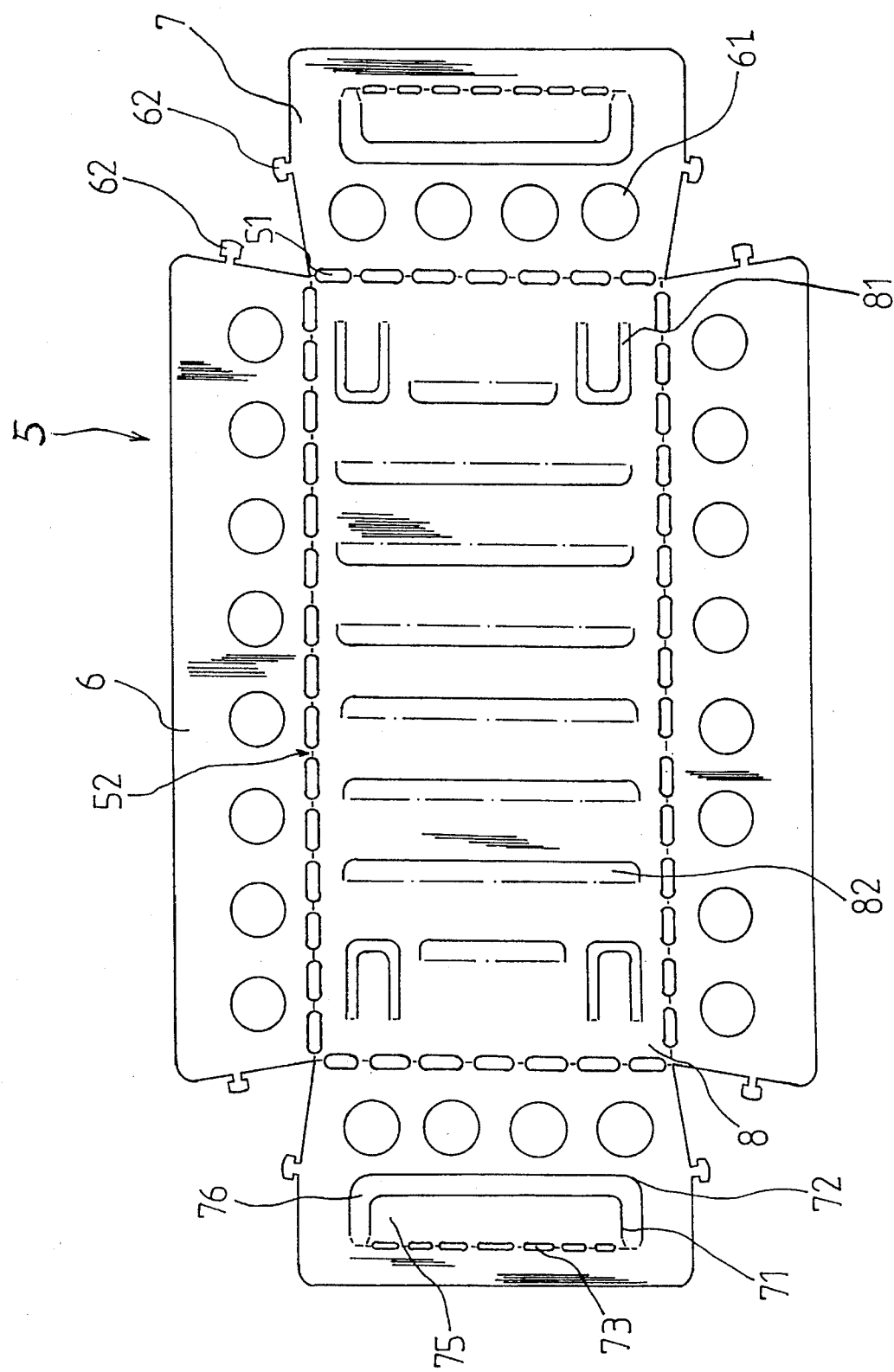
FIG. 2 is a plane view of the barbecue oven in a flat pattern of the present invention.
Figure 3:
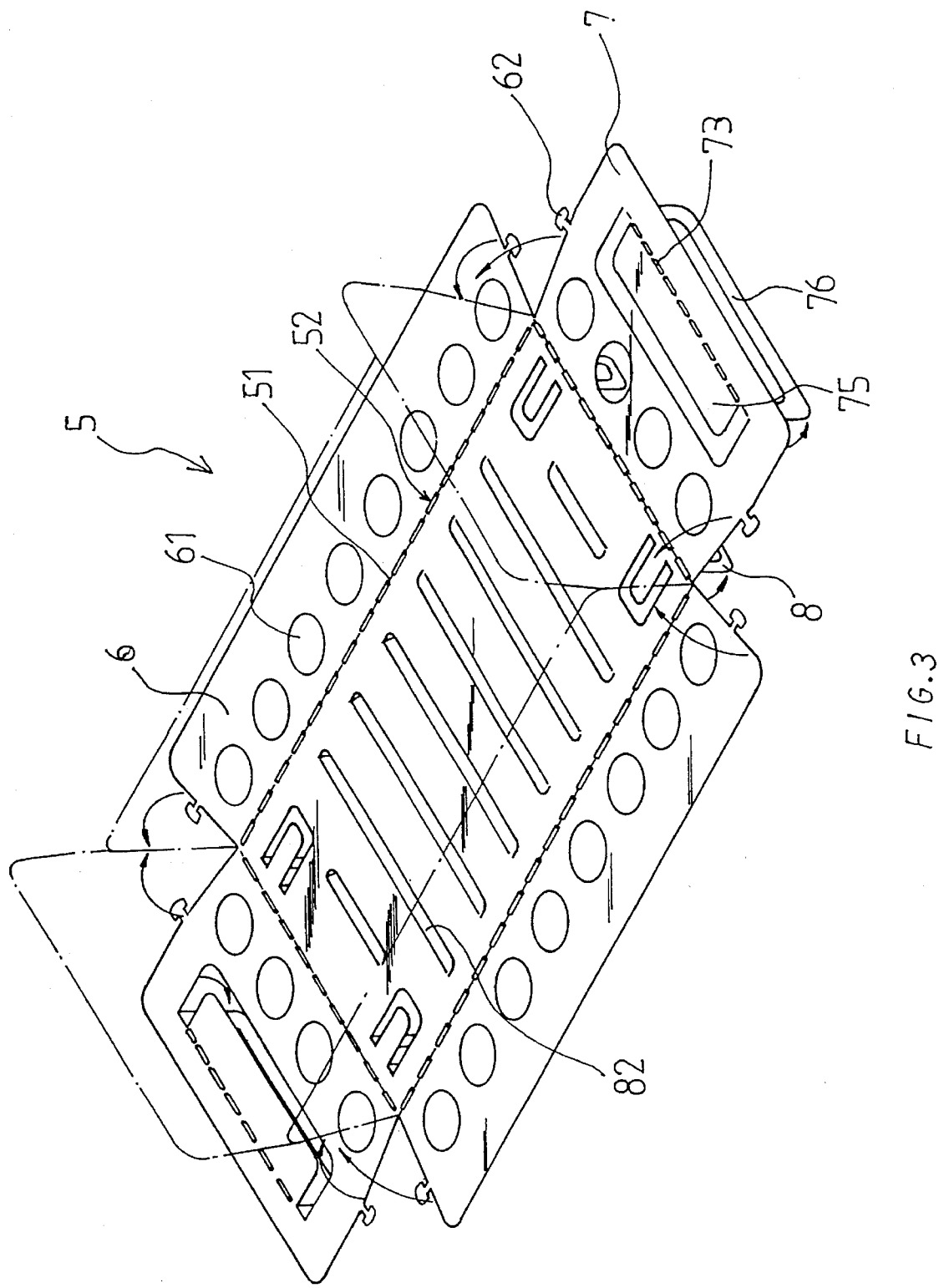
FIG. 3 shows the bending operation of the barbecue oven of the present invention.
Figure 4:
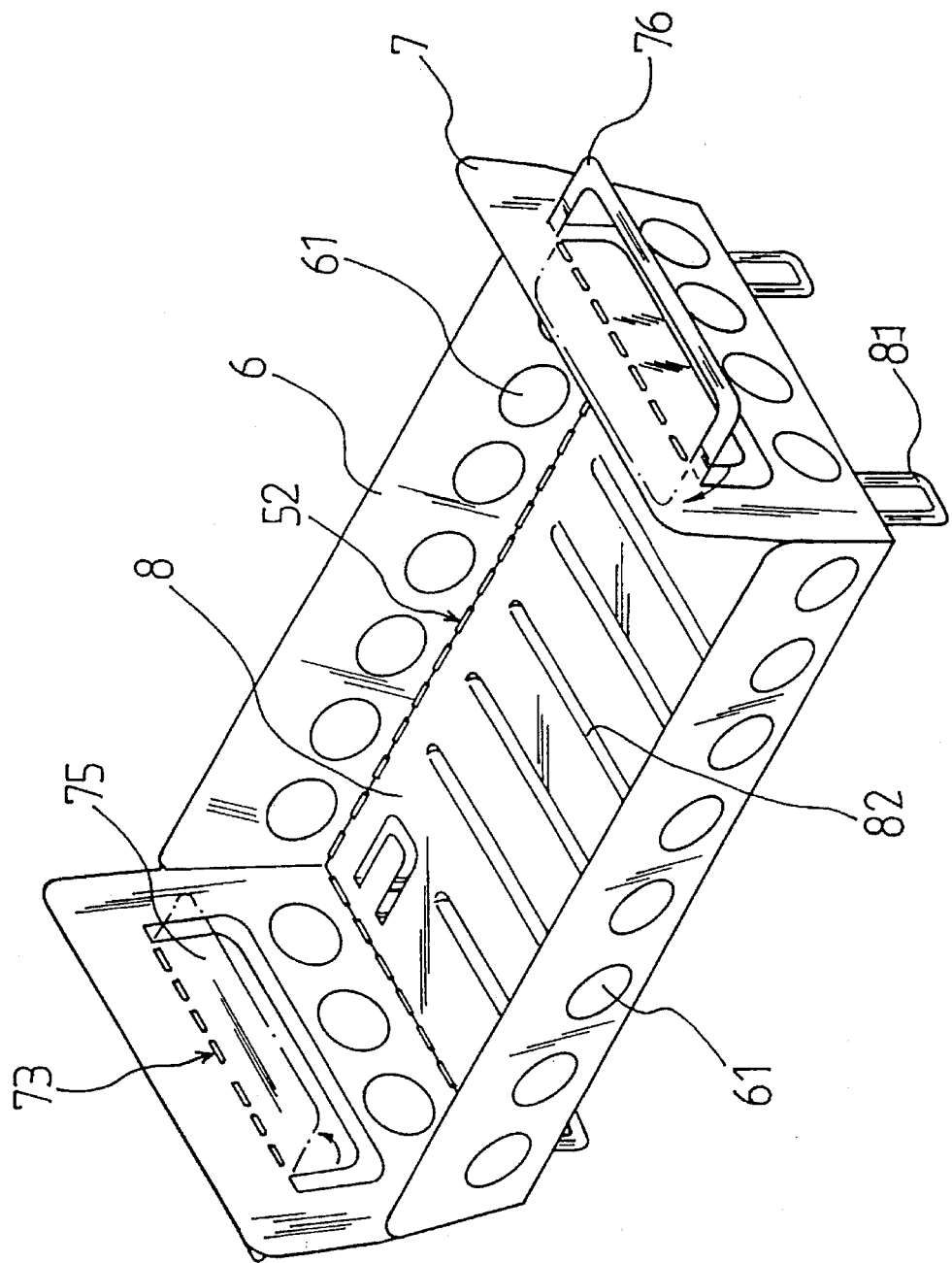
FIG. 4 is a perspective view of the barbecue oven in a box-like pattern of the present invention.

Please refer to FIGS. 2, 3 and 4. The barbecue oven of the present invention has a main body 5 integrally made from a plane metal plate by punching at one time. The main body 5 has a substantially flat cross-like pattern, including a bottom section 8, two long side sections 6 and two short side sections 7. Multiple equally spaced elliptic holes 51 are punched along four adjoining portions of the main body 5 to form four bending lines 52, whereby the main body 5 can be bent into a box pattern defining a chamber for containing charcoal. Multiple equally spaced circular holes 61 are formed on the long side sections 6 and two engaging lugs 62 are formed on two lateral sides of each long side section 6. Four U-shaped support legs 81 are formed on four corners of the bottom section 8 by punching. In addition, multiple equally spaced ventilating slots 82 are punched on the bottom section 8. The number and positions of the ventilating slots 82 to be opened can be decided according to the requirement for ventilation. The short side sections 7 are formed with circular holes 61 as those of the long side sections 6. Moreover, an inner and an outer U-shaped cut lines 71, 72 are punched on each short side section 7 above the circular holes 61 thereof. Multiple equally spaced elliptic holes 73 are punched on the short side section 7 to form a bending line 74 connecting two ends of the inner cut line 71, whereby a portion defined by the inner cut line 71 and the bending line 74 can be bent inward to form a support portion 75, while a U-shaped portion defined by the inner and outer cut lines 71, 72 can be bent outward to form a handle portion 76. Two engaging lugs 62 are formed on two lateral sides of each short side section 7 for engaging with the engaging lugs 62 of the long side section 6. After bent, the short side sections 7 are higher than the long side sections 6.

When used, the long and short side sections 6 and 7 are bent about the bending lines 52 to a position perpendicular to the bottom section 8 so as to form a box-like pattern defining a chamber for containing charcoal. Then the engaging lugs 62 of the long and short side sections 6, 7 are engaged with each other so as to securely connect the long and short side sections 6, 7. In addition, the U-shaped support legs 81 of the bottom section 8 are bent outward to support the main body 5 of the barbecue oven. The circular holes 61 of the long and short side sections 6, 7 serve to ventilate the chamber. Also, some or all of the ventilating slots 82 of the bottom section 8 can be selectively opened to ventilate the chamber as well as exhaust the ash of the charcoal therefrom. A rack can be placed on the long side sections 6 so that the food to be barbecued can be placed on the rack. Alternatively, in the case that more charcoal is contained in the chamber, the rack can be placed on the support portions 75 of the short side sections 7, which is higher than the long side sections 6. Accordingly, the rack can be selectively positioned on one of two levels.

The advantages of the present invention are as follows:

1. The barbecue oven is made from one piece of metal plate by punching so that the manufacturing procedure of the barbecue oven is simplified.

2. The manufacturing time and cost of the barbecue oven are reduced.

3. Before used, the barbecue oven has a flat pattern without occupying much room so as to facilitate transferring operation thereof.

4. In use, the flat pattern can be easily bent into a box-like pattern defining a chamber for containing charcoal.

5. The rack can be selectively placed on one of two levels.

6. The circular holes and ventilating slots of the main body are able to ventilate the chamber well and the ventilating slots can be selectively opened to exhaust the ash of the charcoal.

The above embodiment is only an example of the present invention and the scope of the present invention should not be limited to the example. Any modification or variation derived from the example should fall within the scope of the present invention.

What is claimed is:

1. A barbecue oven integrally made from a plane metal plate by punching at one time, said barbecue oven having a substantially flat cross-like pattern, including a bottom section, two long side sections and two short side sections, multiple equally spaced elliptic holes being punched along four adjoining portions between the bottom section, long side sections and short side sections to form four bending lines, whereby the flat cross-like pattern is bendable into a box-like pattern defining a chamber, multiple equally spaced circular holes being formed on the long side sections and two engaging lugs being formed on two lateral sides of each long side section, four U-shaped support legs being formed on four corners of the bottom section by punching, multiple equally spaced ventilating slots being punched on the bottom section, the ventilating slots being selectively openable in number and position according to ventilation requirement, the short side sections being formed with circular holes as the long side sections, an inner and an outer U-shaped cut lines being punched on each short side section above the circular holes thereof, multiple equally spaced elliptic holes being punched on the short side section to form a bending line connecting two ends of the inner cut line, whereby a portion defined by the inner cut line and the bending line is inward bendable to form a support portion, while a U-shaped portion defined by the inner and outer cut lines is outward bendable to form a handle portion, two engaging lugs being formed on two lateral sides of each short side section for engaging with the engaging lugs of the long side section so as to securely connect the long and short side sections, after bent, the short side sections being higher than the long side sections.

* * * * *